United States Patent [19]
Jung et al.

[11] Patent Number: 5,336,753
[45] Date of Patent: Aug. 9, 1994

[54] POLYCONDENSATION AND/OR ADDITION PRODUCT CONTAINING CARBOXYL GROUPS AND TERTIARY AMINO GROUPS, COATING AGENTS BASED THEREON, AND THE USE THEREOF

[75] Inventors: Werner A. Jung; Udo Vorbeck, both of Ascheberg; Arno Schmitz, Nottuln; Wilhelm Heise, Munster; Lutz-Werner Gross, Haltern, all of Fed. Rep. of Germany

[73] Assignee: BASF Lacke + Farben Ag, Münster, Fed. Rep. of Germany

[21] Appl. No.: 2,291

[22] Filed: Jan. 8, 1993

Related U.S. Application Data

[63] Continuation of Ser. No. 328,583, Feb. 27, 1989, Pat. No. 5,179,191.

[30] Foreign Application Priority Data

Aug. 29, 1986 [DE] Fed. Rep. of Germany ....... 3629470

[51] Int. Cl.$^5$ .............................................. C08G 69/26
[52] U.S. Cl. .................... 528/335; 528/272; 528/291; 528/292; 528/296; 528/297; 528/308; 528/332; 528/340; 525/420; 525/423; 525/424; 525/437; 525/438; 525/440; 525/449; 525/443
[58] Field of Search ............... 528/272, 291, 292, 296, 528/297, 308, 332, 335, 340; 525/420, 423, 424, 437, 438, 440, 449, 443

[56] References Cited

U.S. PATENT DOCUMENTS 3,128,265  4/1964  Caldwell ........................... 525/533

Primary Examiner—Samuel A. Acquah
Attorney, Agent, or Firm—Kenyon & Kenyon

[57] ABSTRACT

The present invention relates to a polycondensation and/or addition product containing carboxyl groups and amino groups. This can be obtained by reacting a) polycarboxylic acids or anhydrides thereof, if appropriate together with monocarboxylic acids,
b) polyols, if appropriate together with monools, and, if appropriate
c) further modifying components, and, if appropriate,
d) a component which is capable of reacting with the reaction product from a), b) and, if appropriate, c), with the proviso that the final product contains tertiary amino groups which originate from components a) and/or b) and/or d), and the reaction product from a), b), if appropriate c) and if appropriate d) has an acid number from 5 to 200, preferably 10 to 130, and an amine number from 3 to 150, preferably 10 to 100.

The invention also relates to a process for the preparation of the polycondensation and/or addition product, and to coating agents based on the polycondensation and/or addition product, a process for the preparation of the coating agents, and the use thereof for automobile refinishing of automobile bodies and as a topcoat, filler, varnish, primer or undercoat.

26 Claims, No Drawings

POLYCONDENSATION AND/OR ADDITION PRODUCT CONTAINING CARBOXYL GROUPS AND TERTIARY AMINO GROUPS, COATING AGENTS BASED THEREON, AND THE USE THEREOF

This application is a continuation of application Ser. No. 07/328,583, filed on Feb. 27, 1989, U.S. Pat. No. 5,179,191.

The present invention relates to polycondensation and/or addition products containing carboxyl groups and amino groups, coating agents based on these polycondensation and/or addition products containing carboxyl groups and amino groups, and the use thereof.

It is known that compounds which contain an epoxy ring react with compounds containing carboxyl groups, with ring opening. When compounds containing more than one epoxy group and more than one carboxyl group are used, the reaction proceeds with formation of polymeric esters which contain secondary hydroxyl groups. This polymer formation is known under the term "acid-curing epoxy resins".

It is known that this epoxy-carboxy reaction can be catalyzed by suitable basic compounds. Suitable basic catalysts are, for example, diazabicyclooctane, diazabicyclononene, diazabicycloundecene, imidazole derivatives, such as 3-methyl-, phenyl-or cyclohexylimidazole, trialkylamines, such as triethyl-, tributyl- or tricyclohexyl-amine, N,N'-dialkylpiperazines, trialkyl- or triaryl-phosphines, hydroxides, carbonates and salts of organic acids of the alkali metals, such as lithium hydroxide, potassium carbonate, sodium benzoate and lithium benzoate. Further suitable catalysts are chelates of magnesium, aluminum and titanium.

EP-B-2,284 discloses a reactive, curable polymer mixture based on epoxy compounds and polycarboxylic acid units. By using polycarboxylic acids which are modified with primary amino groups, polycarboxylic acid units containing primary amino groups are obtained. The disadvantage in this case is the danger of gelling. In order to achieve low curing temperatures and short curing times, external catalysts are necessary.

EP-B-51,275 discloses a reactive, curable binder mixture based on epoxy compounds, polycarboxylic acid units based on polymerization and/or condensation products, and a catalyst component in the form of alkali metal and alkaline-earth metal salts of a polycarboxylic acid unit. The mixtures cure completely at room temperature or at slightly elevated temperature and can be used, in particular, for metal-effect paintwork. In this case, the curing catalyst is incorporated into the binder in the form of an alkali metal salt or an alkaline-earth metal salt. Although an internal catalyst is involved in this case, incompatibility problems may occur.

EP-B-5,868 discloses a water-soluble reactive binder which can be obtained from cyclic polycarboxylic acid compounds, salt-forming substances, such as, for example organic bases, polymers containing hydroxyl groups, and epoxy compounds. The individual binder components can be present in chemically bound form. The mixtures cure at room temperature, and they are preferably used in the form of their aqueous solutions. Organic bases, such as, for example, tertiary amino compounds, cause the water-solubility of the binder system. In order to accelerate curing of the binder mixture, an external catalyst must be used, which is associated with severe problems with respect to compatibility.

The object of the present invention was to provide a coating agent based on acid-curing epoxy resins, where complete curing of the coating agent should occur at a sufficiently high rate and at the lowest possible temperatures. The films produced should have good or even improved properties in respect of hardness and elasticity. It should be possible to omit the use of an external catalyst in order to avoid incompatibility problems.

The invention relates to a polycondensation and/or addition product containing carboxyl groups and amino groups, which can be obtained by reaction of
a) polycarboxylic acids or anhydrides thereof, if appropriate together with monocarboxylic acids,
b) polyols, if appropriate together with monools, and, if appropriate,
c) further modifying components, and, if appropriate,
d) a component which is capable of reacting with the reaction products from a), b) and, if appropriate, c),
with the proviso that the final product contains tertiary amino groups which originate from component a) and/or b) and/or d), and the reaction product from a), b), if appropriate c) and if appropriate d) has an acid number from 5 to 200, preferably 10 to 130, and an amine number from 3 to 150, preferably 10 to 100.

Suitable polycarboxylic acids (component a) are, for example, phthalic acid, isophthalic acid, terephthalic acid, halophthalic acids, such as tetrachloro- or tetrabromo-phthalic acid, hexahydrophthalic acid, adipic acid, sebacic acid, fumaric acid, maleic acid, endomethylenetetrahydrophthalic acid, trimellitic acid, and anhydrides of the acids mentioned, where these exist.

Monocarboxylic acids, such as, for example, benzoic acid, tert.-butylbenzoic acid, lauric acid, isononanoic acid, and fatty acids of naturally occurring oils, may also be employed, if appropriate, together with the polycarboxylic acids.

Suitable alcohol components b) are polyhydric alcohols, such as ethylene glycol, propanediols, butanediols, pentanediols, hexanediols, neopentyl glycol, diethylene glycol, cyclohexanedimethanol, trimethylpentane diol, ditrimethylolpropane, trimethylolethane, trimethylolpropane, glycerol, pentaerythritol, dipentaerythritol, trishydroxyethyl isocyanurate, polyethylene glycol and polypropylene glycol, if appropriate together with monohydric alcohols, such as, for example, butanol, octanol, lauryl alcohol or ethoxylated or propoxylated phenols.

As component a) (carboxylic acid component), aminocarboxylic acids containing at least one tertiary amino group may be used inter alia or exclusively. Examples of these are: pyridine-2-carboxylic acid, pyridine-3-carboxylic acid, pyridine-4-carboxylic acid, dimethylaminobenzoic acid and pyridine-2,6-dicarboxylic acid. In this case, nicotinic acid, i.e. pyridine-3-carboxylic acid, is preferably used, since this is a very reactive aminocarboxylic acid with respect to catalyzing the acid/epoxy reaction.

As component a), the product of the reaction of an amino alcohol containing at least one tertiary amino group with a polycarboxylic anhydride can advantageously be used. The product of the reaction of 2-hydroxyethylpyridine with phthalic anhydride may be mentioned as an example of such a reaction product.

As component a), the product of the reaction of a polyamine containing at least one tertiary and at least one primary or secondary amino group with a polycarboxylic anhydride is preferably used.

As the alcohol component b), amino alcohols containing at least one tertiary amino group may be used inter alia or, alternatively, exclusively. Examples of such amino alcohols which may be mentioned are 2-hydroxyethylpyridine and dimethylaminopropanol. As the alcohol component b), products of the reaction of epoxy resins with carboxylic acids and/or amines are preferably employed.

As the modifying component c), polyisocyanates and/or diepoxide compounds, if appropriate also monoisocyanates and/or monoepoxide compounds, are preferably used. Suitable polyisocyanates are, for example, the toluylene diisocyanates, hexamethylene diisocyanate and isophorone diisocyanate. Diepoxide compounds are taken to mean epoxy resins containing on average about two epoxide groups per molecule. Suitable monoepoxide compounds are, for example, olefin oxides, such as octylene oxide, butyl glycidyl ether, allyl glycidyl ether, phenyl glycidyl ether, p-butylphenol glycidyl ether, cresyl glycidyl ether, styryl oxide, glycidyl methacrylate, vinylcyclohexene monoxide, dipentene monoxide, α-pinene oxide and glycidyl esters of tertiary carboxylic acids.

It is particularly advantageous when, as the alcohol component b), the product of the reaction of low-molecular-weight epoxy resins with polycarboxylic acids and/or polycarboxylic anhydrides and aminocarboxylic acids containing at least one tertiary amino group and/or polyamines containing at least one tertiary and at least one primary or secondary amino group is used, esterification subsequently being carried out, if appropriate, with the acid and the alcohol component and modification, if appropriate, with polyisocyanates. Low-molecular-weight epoxy resins are taken to mean epoxy resins having a molecular weight of below about 2000.

As component d) which is capable of reacting with the reaction product from a), b) and, if appropriate, c), monoisocyanates containing at least one tertiary amino group are preferably used. These can be prepared, for example, by reacting suitable diisocyanates, such as isophorone diisocyanate, with aminoalcohols containing a tertiary amino group, such as, for example, hydroxyethylpyridine or dimethylaminoethanol, or with polyamines containing at least one tertiary and at least one secondary or primary amino group. The monoisocyanates are bound to the binder system by reaction with free hydroxyl groups of the polycondensation and/or addition product, with formation of a urethane bond.

As component d), polyamines containing at least one tertiary and at least one primary or secondary amino group are advantageously used. Dimethylaminopropylmethylamine may be mentioned as an example of such polyamines.

As the alcohol component, the product of the ring-opening of epoxy resins using hydrogen-active compounds can also preferably be used. Thus, for example, diepoxides, such as the known Epikote types, can firstly be reacted in steps with dicarboxylic acids, such as, for example, pyridine-2,6-dicarboxylic acid, to form a precursor, which is then further employed as the alcohol component.

It is in any case essential to the invention that the final product obtained has an acid number in the range from 5 to 200 and an amine number in the range from 3 to 150.

It is preferred when the polycondensation and/or addition product is obtainable from a) polycarboxylic acids or anhydrides thereof, if appropriate together with monocarboxylic acids, b) polyols, if appropriate together with monools, components a) and/or b) containing ethylenically unsaturated double bonds, c) if appropriate further modifying components, and d) mercapto compounds containing at least one tertiary amino group, with the proviso that the product contains tertiary amino groups which originate essentially or entirely from component d), As component a) in this case, maleic anhydride or unsaturated fatty acids, for example, are used; an unsaturated alcohol which is suitable as component b) is, for example, 1,4-butenediol. In this case, the mercapto groups of the aminomercaptan containing a tertiary amino group add to the double bonds which are introduced into the binder by means of component a) and/or b).

The polycondensation and/or addition products according to the invention are preferably obtainable by reacting a relatively high-molecular-weight epoxy resin containing on average at least three epoxy groups per molecule with polycarboxylic acids and/or polycarboxylic anhydrides and with an aminocarboxylic acid containing at least one tertiary amino group and/or polyamines containing at least one tertiary and at least one primary or secondary amino group. As relatively high-molecular-weight epoxy resins containing on average at least three epoxy groups per molecule, epoxidized novolaks can be employed, for example. These are formed by reacting novolaks with epichlorohydrin, The present invention also relates to a process for the preparation of a polycondensation and/or addition product containing carboxyl groups and amino groups, wherein the reaction of a) polycarboxylic acids or anhydrides thereof, if appropriate together with monocarboxylic acids, b) polyols, if appropriate together with monools, and, if appropriate, c) further modified components, and, if appropriate, d) a component which is capable of reacting with the reaction product from a), b) and, if appropriate, c), is carried out simultaneously or stepwise by means of esterification and/or transesterification and/or addition reactions, with the proviso that the final product contains tertiary amino groups which originate from component a) and/or b) and/or d), and the reaction product from a), b), if appropriate c) and if appropriate d) has an acid number from 5 to 200, preferably 10 to 130, and an amine number from 3 to 150, preferably 10 to 100.

Suitable compounds of component a) are phthalic acid, isophthalic acid, terephthalic acid, halophthalic acids, such as tetrachloro-or tetrabromophthalic acid, hexahydrophthalic acid, adipic acid, sebacic acid, fumaric acid, maleic acid, endomethylenetetrahydrophthalic acid, trimellitic acid, and anhydrides of the acids mentioned, if these exist, Suitable monocarboxylic acids which can be employed together with the polycarboxylic acids are, for example, benzoic acid, tert.-butylbenzoic acid, lauric acid, isononanoic acid and fatty acids of naturally occurring oils.

Suitable alcohol components (b) are polyhydric alcohols, such as ethylene glycol, propanediols, butanediols, pentanediols, hexanediols, neopentyl glycol, diethylene glycol, cyclohexanedimethanol, trimethylpentanediol, ditrimethylolpropane, trimethylolethane, trimethylolpropane, glycerol, pentaerythritol, dipentaerythritol or trishydroxyethyl isocyanurate, if appropriate together with monohydric alcohols, such as, for example, butanol, octanol, lauryl alcohol and ethoxylated or propoxylated phenols.

As the carboxylic acid component a), aminocarboxylic acids containing at least one tertiary amino group can be used, inter alia or exclusively. In this case, pyridine-3-carboxylic acid, i.e. nicotinic acid, preferably used. The product of the reaction of an aminoalcohol containing at least one tertiary amino group with a polycarboxylic anhydride is also suitable as the carboxylic acid component a). The product of the reaction of 2-hydroxyethylpyridine with phthalic anhydride may be mentioned as an example of such products, It is particularly advantageous when the acid component used is the product of the reaction of a polyamine containing at least one tertiary and at least one primary or secondary amino group with a polycarboxylic anhydride.

The tertiary amino group can also be introduced into the binder through the alcohol component b), for example. In this case, an aminoalcohol containing at least one tertiary amino group is employed as component b). Examples of amino alcohols containing at least one tertiary amino group are 2-hydroxyethylpyridine and dimethyl aminopropanol.

According to the process according to the invention, a product of the reaction of epoxy resins with carboxylic acids and/or amines can be used as the alcohol component b).

It is preferred when polyisocyanates and/or diepoxide compounds, if appropriate also monoisocyanates and/or monoepoxide compounds, are employed as the modifying component c).

A preferred embodiment of the process according to the invention comprises using the product of the reaction of low-molecular weight epoxy resins with polycarboxylic acids and/or polycarboxylic anhydrides and aminocarboxylic acids containing at least one tertiary amino group and/or polyamines containing at least one tertiary and at least one primary or secondary amino group as component b), esterification subsequently being carried out, if appropriate, with components a) and b) and modification, if appropriate, with polyisocyanates.

When epoxy resins are used, low-chlorine types should be employed since, otherwise, strong discoloration of the products can occur.

As component d), a monoisocyanate containing at least one tertiary amino group is preferably used. This can be prepared, for example, by reacting diisocyanates, such as, for example, isophorone diisocyanate, with amino-alcohols containing a tertiary amino group, such as, for example, hydroxyethylpyridine or dimethylaminoethanol, or with polyamines containing at least one tertiary and at least one secondary or primary amino group. Component d) is bound to the binder system through reaction with free hydroxyl groups of the product formed previously, with formation of a urethane bond.

It is particularly advantageous when, as component d) in the process according to the invention, a polyamine containing at least one tertiary and at least one primary or secondary amino group is used. An example of such a polyamine is dimethylaminopropylmethylamine.

A preferred embodiment of the process according to the invention comprises reacting
 a) polycarboxylic acids or anhydrides thereof, if appropriate together with monocarboxylic acids,
 b) polyols, if appropriate together with monools, components a) and/or b) containing ethylenic double bonds, and, if appropriate,
 c) further modifying components, and
 d) mercapto compounds containing at least one tertiary amino group,
with the proviso that the product contains tertiary amino groups which originate essentially or entirely from component d).

In this case, the SH group of the mercapto compound adds to the ethylenically unsaturated double bonds which originate from components a) and/or b). Examples of polycarboxylic acids or anhydrides thereof or monocarboxylic acids containing ethylenically unsaturated double bonds are maleic anhydride and ethylenically unsaturated fatty acids.

An example of a polyol component containing a polymerizable double bond is 1,4-butenediol.

A preferred process for the preparation of polycondensation and/or addition products containing carboxyl groups and tertiary amino groups comprises reacting relatively high-molecular-weight epoxy resins containing on average at least three epoxy groups per molecule with polycarboxylic acids and/or polycarboxylic anhydrides and with an aminocarboxylic acid containing at least one tertiary amino group and/or polyamines containing at least one tertiary and at least one primary or secondary amino group.

The epoxy resins employed in this process are advantageously epoxidized novolaks.

If the tertiary amino group is to be introduced into the binder system mainly or entirely through component d), a preferred embodiment of the process according to the invention comprises initially preparing a reaction product having an acid number of 5 to 200, preferably 10 to 130, by reaction of components a), b) and, if appropriate, c), the reaction product subsequently being further reacted with component d) until the desired amine number is achieved.

A further preferred process variant comprises condensing or adding, in a first stage, components a), b) and, if appropriate, c) to form a product having an acid number of t to 50, preferably 5 to 20, and further reacting this product, in a second stage, with polycarboxylic anhydrides until an acid number of 5 to 200, preferably 10 to 130, is produced.

Excessive discoloration of the products during the condensation is avoided by adding antioxidants or reducing agents, such as, for example, hypophosphorous acid.

The present invention also relates to a coating composition containing organic solvents, conventional additives and auxiliaries, if appropriate pigments, the polycondensation and/or addition product, prepared by the process described above, and, as crosslinking agent, an epoxy resin containing on average more than one epoxy group per molecule, the ratio of the free carboxyl groups in the polycondensation and/or addition product to the number of epoxy groups in the epoxy resin being in the range from 1:5 to 5:1. Examples of suitable epoxy resins are products of the condensation of epichlorohydrin and bisphenol A, for example cycloaliphatic bisepoxides, epoxidized polybutadienes, which are produced by reacting commercially available polybutadiene oils with peracids or organic acid/$H_2O_2$ mixtures, epoxidation products of naturally occurring fats, oils, fatty acid derivatives, modified oils, novolaks containing epoxy groups, glycidyl ethers of a polyhydric alcohol, for example ethylene glycol diglycidyl ether, glycerol polyglycidyl ether, sorbitol polyglycidyl ether, trimethylolpropane polyglycidyl ether and pentaerythritol polyglycidyl ether, and suitable acrylate resins containing oxirane side groups. Furthermore, the crosslinking agents can advantageously also be products of the reaction of polyepoxides containing hydroxyl groups with di- or polyisocyanates, as are produced, for example, by reacting OH-functional epoxides, such as, for example, sorbitol polyglycidyl ethers, with isophorone diisocyanate.

Suitable solvents are, for example, toluene, xylene, butanol, ethyl acetate, butyl acetate, pentyl acetate, dimethyl glutarate, dimethyl succinate, 1- methoxy-2 propyl acetate, 2-ethylhexanol, ethylene glycol diacetate, ethylene glycol monoethyl and monobutyl ether or the acetates thereof, ethylene glycol dimethyl ether, diethylene glycol dimethyl ether, naphthas containing aromatics, cyclohexanone, methyl ethyl ketone, acetone, butyl acetoxyglycolate and ethyl acetoxyglycolate. Suitable additives and auxiliaries are, for example, fillers, such as, for example, talcum, mica, kaolin, chalk, quartz sand, asbestos powder, barium sulfate, silicates, glass fibers, sedimentation inhibitors such as, for example, finely divided silica, bentonire, colloidal silicates and the like.

The present invention also relates to a process for the preparation of the abovementioned coating agents, wherein the polycondensation and/or addition product, prepared by the process described above, the epoxy resin containing on average more than one epoxy group per molecule, and organic solvents, conventional additives and auxiliaries and, if appropriate, pigments are processed by mixing and, if appropriate, dispersing to form a coating composition, the ratio of the free carboxyl groups in the polycondensation and/or addition product to the number of epoxy groups in the epoxy resin being in the range 1:5 to 5:1.

The coating agents according to the invention can be applied to a very wide variety of substrates. Suitable substrates are, for example, metals, such as iron, zinc, titanium, copper, aluminum, steel, brass, bronze, magnesium or the like, and furthermore ceramics, wood, glass, concrete and plastics.

The coating agents according to the invention cure at relatively low temperature, i.e. at room temperature or at slightly elevated temperatures. The low curing temperature and the short curing time can be attributed to the presence of an internal catalyst in the binder system. If short curing times and low curing temperatures are desired, a polycondensation and/or addition product having a relatively high amine number is employed.

By suitable choice of the alcohol component, the acid component and the modifying components, the properties of the final product in respect of hardness, elasticity and reactivity can be controlled in an excellent fashion.

Aromatic acid components lead to products having relatively great hardness, whereas cycloaliphatic or aliphatic acid components lead to relatively elastic films.

By using suitable monocarboxylic acids, the hardness and elasticity can likewise be influenced. Relatively hard films are obtained when benzoic acid is used, whereas essentially softer films are obtained when fatty acids are used. The use of hexanediols as the alcohol components leads to elastic films, whereas, in contrast, the use of neopentyl glycol and pentaerythritol leads to relatively hard coatings.

Aromatic tertiary amino groups in the binder system have a higher catalytic activity than aliphatic or araliphatic amino groups.

Due to the low curing temperatures and the short curing times, the coating agents according to the invention are preferably used for automobile refinishing.

In addition, they are highly suitable as top coats, fillers, varnishes, primers or undercoats.

The choice of the epoxy resin depends on the intended use. When used as a top coat, aliphatic epoxy resins are preferably used, and aromatic epoxy resins are also suitable for undercoats.

The problem of discoloration which may occur on use as a varnish can be avoided by incorporating preferably aliphatic tertiary amino groups into the binder system. In the case of varnishes, low-chlorine or chlorinefree epoxy resins should be employed; discoloration phenomena do not then occur.

The films obtained from the binders or coating agents according to the invention have excellent properties in respect of hardness, elasticity and reactivity. A further advantage is that the use of an external catalyst can be omitted.

If curing is to be carried out under baking conditions, i.e. at temperatures of at least 100° C., the coating agent according to the invention can additionally contain a heat-curable ether- and/or amino- and/or OH group-containing synthetic resin, such as, for example, phenol or amino resins.

The invention is illustrated in greater detail below with reference to illustrative embodiments. Parts denote parts by weight, unless otherwise stated.

EXAMPLE 1

Preparation of Polyester Resin I 1110.7 parts of phthalic anhydride, 742.1 parts of trimethylol propane, 187.2 parts of pyridine-3-carboxylic acid and 139.2 parts of 2-ethylhexanoic acid are heated slowly, with addition of 87 parts of xylene as entrainer, in a 4 liter polycondensation kettle equipped with stirrer and water separator, and the condensation reaction is carried out at 200°–205° C. to an acid number of about 70. After cooling and partially dissolving with 420 parts of xylene, 420 parts of methoxypropanol and 420 parts of butyl acetate (98/100), a solution of the acidic polyester having an acid number of 66, a viscosity (original) of 27 dPa.s and a solids content of 60% is obtained.

EXAMPLE 2

Preparation of Polyester Resin II 880 parts of phthalic anhydride, 247.2 parts of trimethylhexanoic acid, 192.5 parts of pyridine-3-carboxylic acid and 838.7 parts of trimethylolpropane are heated slowly to 205° C., with addition of 86 parts of xylene as entrainer and 0.648 parts of hypophosphorous acid, in a polycondensation kettle equipped with stirrer and water separator, and the condensation reaction is carried out to 205°–210° C. to an acid number of about 12. The mixture is then cooled to 130° C. and partly dissolved with 396 parts of xylene. 325 parts of phthalic anhydride are subsequently added, and the addition reaction with the hydroxyl groups of the polyester is carried out at 130° C. When the addition reaction is complete, the reaction mixture is partially dissolved with 281 parts of xylene and 763 parts of butanol. The resin solution thus obtained has a solids content of 63%, an acid number of 64 and a viscosity of 27 dPa.s (original).

EXAMPLE 3

Preparation of Polyester Resin III 493 parts of isophthalic acid, 440 of phthalic anhydride, 247.2 parts of trimethylhexanoic acid, 192.5 parts of pyridine-3-carboxylic acid and 838.7 parts of trimethylolpropane are heated slowly to about 200° C., with addition of 88 parts of xylene as entrainer and 0.6632+parts of hypophosphorous acid, in a polycondensation kettle, and the condensation reaction is carried out at 200°–210° C. to an acid number of 20. The mixture is cooled to 130° C. and partially dissolved with 532 parts of xylene. 450 parts of phthalic anhydride are than added, and the addition reaction with the polyester is carried out at 130° C. After addition of 376 parts of xylene and 995 parts of butanol, the polyester solution obtained has a sol ids content of 59%, an acid number of 88.5 and a viscosity of 11 dPa.s (original).

EXAMPLE 4

Preparation of Polyester Resin IV 315.6 parts of phthalic anhydride and 131.1 parts of 2-hydroxyethylpyridine are kept at 140°–150° C. for 4 hours in a polycondensation kettle, and, at 140° C., 409.4 parts of trimellitic anhydride, 310.5 parts of neopentyl glycol, 285.7 parts of trimethylolpropane, 130.1 parts of benzoic acid and 168.5 of trimethylhexanoic acid and 0.525 parts of hypophosphorous acid and, as entrainer, 70 parts of xylene are then added. The mixture is heated to 175° C. and the condensation reaction is carried out to an acid number of about 84. After cooling and partially dissolving with 557 parts of xylene and 557 parts of butanol, a polyester solution having a solids content of 57%, acid number of 84 and a viscosity (original) of 21 dPa.s is obtained.

EXAMPLE 5

Preparation of Polyester Resin V 443.5 parts of isophthalic acid, 411.4 parts of hexahydrophthalic acid, 105.5 parts of isononanoic acid, 333 parts of para-tert.butylbenzoic acid, 304.8 parts of 4-(N,N-dimethylamino)-benzoic acid, 537 parts of trimethylolpropane, 263.4 parts of pentaerythritol and 0.959 parts of hypophosphorous acid, and also 96 parts of xylene as entrainer, are heated slowly to 195° C. in a polycondensation kettle, and the condensation reaction is carried out at 195°–205° C. to an acid number of 15. The mixture is subsequently cooled and partially dissolved with 305 parts of xylene. 169.4 parts of hexahydrophthalic acid and 116 parts of xylene are added to 1172 parts of this resin solution, and the addition reaction between the anhydride and the polyester is carried out at 140° C., After partially dissolving with 390 parts of xylene and 98 parts of butanol, a resin solution having a solids content of 61%, an acid number of 68 and a viscosity (original) of 26.5 dPa.s is obtained. (The viscosity of a solution diluted with xylene to a solids content of 50% is 4.3 dPa.s.)

EXAMPLE 6

Preparation of Polyester Resin VI 230 parts of pyridine-3-carboxylic acid, 333 parts of 4-tert.-butylbenzoic acid, 105.5 parts of isononanoic acid, 443.5 parts of isophthalic acid, 411.4 parts of hexahydrophthalic acid, 537 parts of trimethyl propane, 263.4 parts of pentaerythritol, 0.93 parts of hypophosphorous acid, and 93 parts of xylene as entrainer are heated slowly to 220° C. in a polycondensation kettle, and the condensation reaction is carried out to an acid number of 20.2. After cooling and partially dissolving with 1-methoxy-2-propyl acetate, 444 parts of trimellitic anhydride are added. The mixture is kept at 140° C. until an acid number (alcoholic) of 126 is reached. 290 parts of a glycidyl ester of a $C_{10}$-$\alpha,\alpha'$ alkylalkanecarboxylic acid (e.g. Cardura E 10) are added to 1800 parts of this polyester solution, and the mixture is kept at 85°–90° C. until an acid number of 65 is reached. Addition of 150 parts of xylene, 150 parts of 1-methoxy--2propyl acetate and 750 parts of methoxy-propanol leads to a carboxyl group-containing polyester solution having a solids content of 50.5%, an acid number of 69 and a viscosity of 19 dPa.s.

EXAMPLE 7

Preparation of Polyester Resin VII 518.2 parts of isophthalic acid, 481 parts of hexahydrophthalic acid, 627.5 parts of trimethylolpropane, 324.7 parts of neopentyl glycol, 249.6 parts of pyridine-3-carboxylic acid, 1.1 parts of tin(II) octoate and 88 parts of xylene as entrainer are heated slowly to 200° C. in a polycondensation kettle, and the condensation reaction is carried out at 200°–210° C. to an acid number of 11. The mixture is then cooled to 140° C., and the addition reaction with 369.6 parts of hexahydrophthalic acid is carried out at 140° C. until an acid number of 73.5 is reached. The mixture is partially dissolved with 500 parts of 1-methoxy-2-propyl acetate and 423 parts of xylene. 1240 parts of this polyester solution are heated to 120° C. and 80.3 parts of iso-phorone diisocyanate are added within 30 minutes at 120° C. The mixture is partially dissolved with 580 parts of methoxypropanol, and the resin solution obtained has a solids content of 55%, an acid number of 58 and a viscosity of 25 dPa.s (original).

EXAMPLE 8

Preparation of Polyester Resin VIII 469.2 parts of phthalic anhydride, 263.1 parts of isophthalic acid, 456.7 parts of trimethylolpropane, 538.9 parts of epoxy resin (based on bisphenol A, epoxy equivalent weight 190), 187.8 parts of isononanoic acid, 175.5 parts of pyridine-3-carboxylic acid, 0.627 parts of hypophosphorous acid and 84 parts of xylene as entrainer are heated slowly to 200° C. in a polycondensation kettle, and the condensation reaction is carried out to an acid number of 45. After cooling to 130° C., 390 parts of xylene and 247 parts of phthalic anhydride are added. The temperature is kept at 130° C. until an acid number of 87 is reached. The mixture is then partially dissolved with 234 parts of xylene and 708 parts of butanol. The carboxyl group-containing polyester resin solution has an acid number of 86, a solids content of 62% and a viscosity (diluted with xylene to 50%) of 5.2 dPa.s.

The polyester solutions from examples I to VIII are mixed with various epoxy resins. The mixtures formed from polyester solutions I, II, III, IV, V, VI and VIII are adjusted to a solids content of 55% using xylene, but, in contrast, the mixture made from polyester resin VII is adjusted to a solids content of 50%. The mixtures are knife-coated onto glass sheets (200 μm wet film). The film is cured either at room temperature only or at room temperature after drying for 30 minutes at 60° C. Crosslinking takes place with epoxy resins A, B or C.

A: Aromatic epoxy resin based on bisphenol A, epoxy equivalent weight 450.
B: Aromatic epoxy resin based on the glycidyl ether of a novolak, epoxy equivalent weight 178.
C: Aliphatic epoxy resin based on a polyglycidyl ether of a polyol (sorbitol), epoxy equivalent weight 180.

| Example | Polyester resin | Epoxy resin | Mixing ratio solid/solid | Drying conditions |
|---|---|---|---|---|
| a | I | A | 64/36 | 30 min/60° C. |
| b | IV | B | 79/21 | 30 min/60° C. |
| c | V | B | 82/18 | 30 min/60° C. |
| d | VII | B | 85/15 | 30 min/60° C. |
| e | VI | C | 80/20 | RT |
| f | III | C | 74/26 | RT |
| g | II | C | 81/19 | RT |
| h | VIII | B | 79/21 | RT |

| Example | Pendulum hardness after 6 days (sec) | Double wipes with methyl ethyl ketone after 6 days |
|---|---|---|
| a | 162 | 160 |
| b | 81 | 120 |
| c | 94 | 30 |
| d | 137 | 200 |
| e | 84 | 200 |
| f | 203 | 145 |
| g | 130 | 200 |
| h (8 days) | 150 | 200 |
| g | after 2 days 102 | after 2 days 200 |
| h | after 3 days 98 | after 3 days 200 |

We claim:

1. A polyester resin containing carboxyl groups and amino groups produced by the reaction of:
   a) a carboxylic acid or anhydride;
   b) a polyol, and
   c) a component which is reacted with a), b) or the reaction product of a) and b) to form a product having tertiary amino groups which originate from component a) or b), an amine number from 3 to 150 and an acid number form 5 to 200.

2. A polyester resin as defined in claim 1 wherein component a) comprises an aminocarboxylic acid containing at least one tertiary amino group.

3. A polyester resin as defined in claim 1 wherein component a) comprises a pyridine-3-carboxylic acid.

4. A polyester resin as defined in claim 1 wherein component a) comprises the reaction product of an aminoalcohol containing at least one tertiary amino group and a polycarboxylic anhydride.

5. A polyester resin as defined in claim 1 wherein component a) comprises the reaction product of a polyamine containing at least one tertiary and at least one primary or secondary amino group and a polycarboxylic anhydride.

6. A polyester resin defined in claim 1 wherein component b) comprises an amino alcohol containing at least one tertiary amino group.

7. A polyester resin as defined in claim 6 wherein component a) comprises the reaction product of an epoxy resin and a carboxylic acid or amine containing compound.

8. A polyester resin as defined in claim 7 wherein component c) comprises a polyisocyanate or diepoxy compound.

9. A polyester resin as defined in claim 8 wherein component b) comprises the reaction product of:
   a low molecular-weight epoxy resin;
   a polycarboxylic acid or anhydride, and
   an aminocarboxylic acid containing at least one tertiary amino group or a polyamine containing at least one tertiary and at least one primary or secondary amino group.

10. A polyester resin as described in claim 9 wherein component c) is comprised of a monoisocyanate containing at least one tertiary amino group.

11. A polyester resin as described in claim 10 wherein component c) is further comprised of a polyamine containing at least one tertiary and at least one primary or secondary amino group.

12. A polyester resin as described in claim 1 comprised of the reaction product of a) a polycarboxylic acid or anhydride and a monocarboxylic acid; b) a polyol and a monool wherein at least one of components a) and b) contains an ethylenic double bond, and c) a mercapto compound containing at least one tertiary amino group.

13. A polyester resin as described in claim 1 which is obtained by reacting a high-molecular-weight epoxy resin containing on average at least 3 epoxy groups per molecule with a polycarboxylic acid or anhydride and with an aminocarboxylic acid containing at least one tertiary amino group or a polyamine containing at least one tertiary and at least one primary or secondary amino group.

14. A polyester containing carboxyl groups and amino groups, obtained by reaction of:
   a) a polycarboxylic acid or anhydride and a monocarboxylic acid,
   b) a polyol and a monool, and
   c) a component which is reacted with the reaction product of a) and b) with the proviso that the final product contains tertiary amino groups which originate from component a), b) or c), and the reaction product of a), b) and c) has an acid number from 5 to 200 and an amine number from 3 to 150.

15. A polyester as claimed in claim 14, wherein component a) comprises an aminocarboxylic acid containing at least one tertiary amino group.

16. A polyester as claimed in claim 15, wherein component a) comprises pyridine-3-carboxylic acid.

17. A polyester as claimed in claim 14, wherein component a) comprises the product of the reaction of an aminoalcohol containing at least one tertiary amino group with a polycarboxylic anhydride.

18. A polyester as claimed in claim 14, wherein component a) comprises the product of the reaction of a polyamine containing at least one tertiary and at least one primary or secondary amino group with a polycarboxylic anhydride.

19. A polyester as claimed in claim 14, wherein component b) comprises an amino alcohol containing at least one tertiary amino group.

20. A polyester as claimed in claim 19, wherein component b) comprises the product of the reaction of an epoxy resin with a carboxylic acid or amine.

21. A polyester as claimed in claim 20, wherein component c) comprises a polyisocyanate or diepoxy compound.

22. A polyester as claimed in claim 21, wherein component b) comprises the product of the reaction of a low molecular-weight epoxy resin with a polycarboxylic acid or a polycarboxylic anhydride and an aminocarboxylic acid containing at least one tertiary amino group or a polyamine containing at least one tertiary and at least one primary or secondary amino group, esterification subsequently being carried out with components a) and b).

23. A polyester as claimed in claim 22, wherein component c) comprises a monoisocyanate containing at least one tertiary amino group.

24. A polyester as claimed in claim 23, wherein component c) comprises a polyamine containing at least one tertiary and at least one primary or secondary amino group.

25. A polyester as claimed in claim 14, obtained from a) a polycarboxylic acid or anhydride and monocarboxylic acid, b) a polyol and a monool, at least one of the components a) and b) contains an ethylenic double bond, and c) a mercapto compound containing at least one tertiary amino group, with the proviso that the product contains tertiary amino groups which originate essentially or entirely from component c).

26. A polyester as claimed in claim 14, obtained by reacting a relatively high-molecular-weight epoxy resin containing on average at least 3 epoxy groups per molecule with a polycarboxylic acid or anhydride and with an aminocarboxylic acid or anhydride and with an aminocarboxylic acid containing at least one tertiary amino group or a polyamine containing at least one tertiary and at least one primary or secondary amino group.

* * * * *

UNITED STATES PATENT AND TRADEMARK OFFICE
CERTIFICATE OF CORRECTION

PATENT NO. : 5,336,753
DATED : August 9, 1994
INVENTOR(S) : Jung, et al

Page 1 of 2

It is certified that error appears in the above-indentified patent and that said Letters Patent is hereby corrected as shown below:

In column 2, line 43, change "trimethylpentane diol" to -- trimethylpentanediol --;

Column 5, line 11, change "...acid,..." to -- ...acid, is... --;

Column 6, line 49, change "t" to -- 1 --;

Column 7, line 31, change "bentonire" to -- bentonite --;

Column 8, lines 22 & 23, change "chlo-rinefree" to -- chlor-rine-free --;

Column 9, line 10, change "EXAMPLE3" to -- EXAMPLE 3 --;

Column 9, line 18, change "0.6632+" to -- 0.6634 --;

Column 9, line 26, change "sol ids" to -- solids --;

UNITED STATES PATENT AND TRADEMARK OFFICE
CERTIFICATE OF CORRECTION

PATENT NO. : 5,336,753
DATED : August 9, 1994
INVENTOR(S) : Jung, et al

It is certified that error appears in the above-indentified patent and that said Letters Patent is hereby corrected as shown below:

Column 11, line 51, change "form" to --from--.

Signed and Sealed this

Fourteenth Day of March, 1995

Attest:

BRUCE LEHMAN

*Attesting Officer*   *Commissioner of Patents and Trademarks*